(12) United States Patent  
Binet et al.

(10) Patent No.: US 9,253,147 B2  
(45) Date of Patent: Feb. 2, 2016

(54) METHOD FOR ADDRESSING AN IP NETWORK CONNECTING TO ANOTHER IP NETWORK

(75) Inventors: David Binet, Blainville sur Orne (FR); Yoann Noisette, May sur Orne (FR)

(73) Assignee: Orange, Paris (FR)

(*) Notice: Subject to any disclaimer, the term of this patent is extended or adjusted under 35 U.S.C. 154(b) by 1405 days.

(21) Appl. No.: 11/577,396

(22) PCT Filed: Sep. 12, 2005

(86) PCT No.: PCT/FR2005/002256  
§ 371 (c)(1),  
(2), (4) Date: Feb. 1, 2008

(87) PCT Pub. No.: WO2006/042920  
PCT Pub. Date: Apr. 27, 2006

(65) Prior Publication Data  
US 2008/0144639 A1  Jun. 19, 2008

(30) Foreign Application Priority Data  
Oct. 20, 2004  (FR) .................................. 04 11168

(51) Int. Cl.  
  H04L 29/12  (2006.01)  
  H04W 80/04  (2009.01)  
  H04W 84/00  (2009.01)  
(52) U.S. Cl.  
  CPC ...... *H04L 61/2061* (2013.01); *H04L 29/12283* (2013.01); *H04L 29/12933* (2013.01); *H04L 61/2015* (2013.01); *H04L 61/6068* (2013.01); *H04W 80/04* (2013.01); *H04W 84/005* (2013.01)

(58) Field of Classification Search  
None  
See application file for complete search history.

(56) References Cited

U.S. PATENT DOCUMENTS

| | | | |
|---|---|---|---|
| 5,608,780 A * | 3/1997 | Gerszberg et al. | 455/436 |
| 6,195,705 B1 * | 2/2001 | Leung | 709/245 |
| 6,614,774 B1 * | 9/2003 | Wang | 370/338 |
| 6,621,810 B1 * | 9/2003 | Leung | 370/338 |
| 6,636,498 B1 * | 10/2003 | Leung | 370/338 |
| 6,842,456 B1 * | 1/2005 | Chen et al. | 370/401 |
| 6,865,184 B2 * | 3/2005 | Thubert et al. | 370/401 |
| 6,917,618 B2 * | 7/2005 | Thubert et al. | 370/395.31 |
| 6,928,282 B2 * | 8/2005 | Taniguchi | 455/433 |
| 6,988,146 B1 * | 1/2006 | Magret et al. | 709/238 |
| 7,058,052 B2 * | 6/2006 | Westphal | 370/389 |
| 7,171,215 B2 * | 1/2007 | Khouaja et al. | 455/452.2 |
| 7,289,471 B2 * | 10/2007 | Kawahara et al. | 370/331 |

(Continued)

OTHER PUBLICATIONS

Troan et al., "IPV6 Prefix Options for Dynamic Host Configuration Protocol (DHCP) Version 6" RFC Editor, Dec. 2003, pp. 1-19.*

(Continued)

*Primary Examiner* — Alpus H Hsu  
*Assistant Examiner* — Hooman Houshmand  
(74) *Attorney, Agent, or Firm* — Cozen O'Connor

(57) ABSTRACT

To enable a visitor network to access a host network, a method includes steps in which a router of a visitor network connects to a router of a host network and transmits to it an address request message containing an identifier of the visitor router. The host router extracts, from the address request message received, the identifier of the visitor router, and transmits, to the visitor router, an address assignment message containing either an address or an address prefix of the host network, depending on the identifier of the visitor router extracted from the address request message.

19 Claims, 1 Drawing Sheet

(56) References Cited

U.S. PATENT DOCUMENTS

| | | | |
|---|---|---|---|
| 7,308,495 B2* | 12/2007 | Ishiyama et al. | 709/223 |
| 7,313,631 B1* | 12/2007 | Sesmun et al. | 709/245 |
| 7,333,461 B2* | 2/2008 | Thubert et al. | 370/338 |
| 7,440,451 B2* | 10/2008 | Letney et al. | 370/389 |
| 7,453,887 B2* | 11/2008 | Thubert et al. | 370/395.52 |
| 7,552,234 B2* | 6/2009 | Thubert et al. | 709/238 |
| 7,564,824 B2* | 7/2009 | O'Neill | 370/338 |
| 7,760,693 B2* | 7/2010 | Akiyoshi | 370/338 |
| 7,787,466 B1* | 8/2010 | Leelanivas et al. | 370/392 |
| 7,805,605 B2* | 9/2010 | Takeda et al. | 713/156 |
| 2002/0163895 A1* | 11/2002 | Haller et al. | 370/335 |
| 2003/0018715 A1* | 1/2003 | O'Neill | 709/204 |
| 2003/0054818 A1* | 3/2003 | Bahl et al. | 455/432 |
| 2003/0120766 A1* | 6/2003 | Ishiyama et al. | 709/223 |
| 2003/0161287 A1* | 8/2003 | Venkitaraman et al. | 370/338 |
| 2004/0032852 A1* | 2/2004 | Thubert et al. | 370/349 |
| 2004/0109452 A1* | 6/2004 | Takihiro et al. | 370/392 |
| 2004/0179508 A1* | 9/2004 | Thubert et al. | 370/349 |
| 2004/0202160 A1* | 10/2004 | Westphal | 370/389 |
| 2004/0246931 A1* | 12/2004 | Thubert et al. | 370/338 |
| 2008/0107123 A1* | 5/2008 | Rune et al. | 370/401 |
| 2009/0024732 A1* | 1/2009 | Hirano et al. | 709/223 |
| 2009/0313680 A1* | 12/2009 | Hirano | 726/3 |

OTHER PUBLICATIONS

Paakkanen et al., "Ipv6 Prefix Delegation-based addressing solution for a Mobile Personal Area Network" MultiMedia Signal Processing, 2002 IEEE Workshop, Dec. 9-11, 2002, Piscataway, NJ, USA, IEEE, May 19, 2003, pp. 819-824.

Haberman, "draft-haberman-ipngwg-auto-prefix-02.txt: Automatic Prefix Delegation Protocol Version 6" Internet Draft Publication, Feb. 2002, pp. 1-10.

Ernst et al., "Mobile Networks Support in Mobile Ipv6 (Prefix Scope Binding Updates)", Internet Drafts Archive, Mar. 2002, pp. 1-22.

* cited by examiner

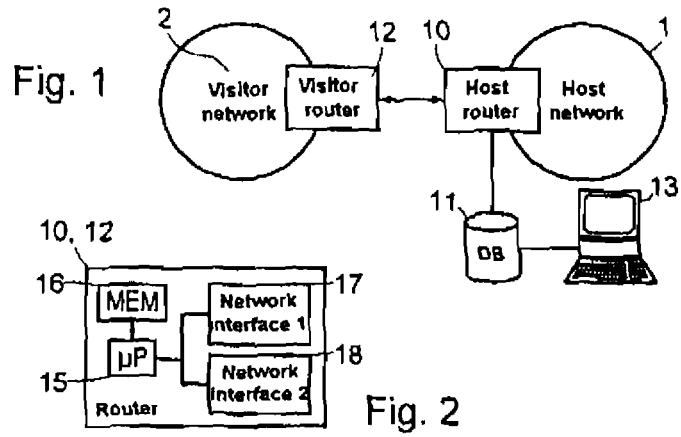
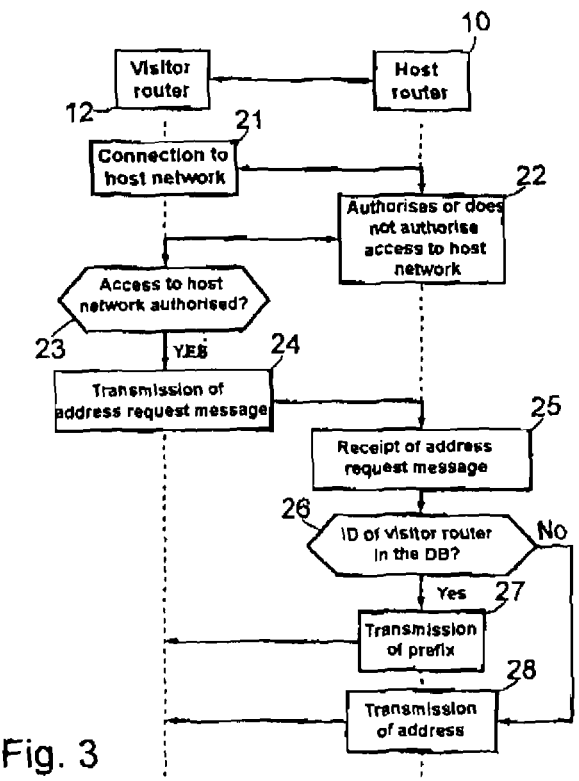

METHOD FOR ADDRESSING AN IP NETWORK CONNECTING TO ANOTHER IP NETWORK

CROSS-REFERENCE TO RELATED APPLICATION

This application is a National Stage application under 35 U.S.C. §371 and claims the benefit under 35 U.S.C. §119(a) of International Application No. PCT/FR2005/002256 having an International Filing Date of Sep. 12, 2005, which claims the benefit of priority of France Application Serial Number 0411168 having a filing date of Oct. 20, 2004, both of which are incorporated herein in their entirety.

This invention relates to access to IP networks from stationary or mobile terminals.

It is applied in particular, but not exclusively, to networks of terminals in a situation of mobility, and more specifically to the connection between this network and a host IP network. This situation of mobility involves a change in the point of connection to an IP network, which can be public, such as the Internet.

There are mechanisms enabling a stationary IP network connecting to another stationary IP network, called the "host" to benefit from an addressing space consistent with that of the host network.

There are also mechanisms derived from the "Mobile IP" protocol enabling a terminal or an IP network in a situation of mobility connecting temporarily to a stationary IP network to maintain its connections and to be connected by means of this network.

When the mobile network is considered to be a visitor to a host IP network to which it connects, and it is undesirable for the host network to assign it an address space from its own addressing plan, mobility mechanisms are applied to the connection between the two networks. When, on the other hand, the mobile network that connects to a host IP network can benefit from an addressing space of the host network, it becomes an integral part of the latter by what is called an IP address prefix delegation.

The prefix delegation consists of assigning an IP network an IP address prefix from which the interfaces of terminals connected to this IP network can configure addresses. Today, the prefix delegation is envisaged in particular for Ipv6 networks connected temporarily or not to an access provider. To provide the prefix delegation, a number of protocols have already been proposed, such as the DHCP (Dynamic Host Configuration Protocol) and RA Proxy (Router Advertisement Proxy).

The mobility of the networks constitutes an extension of the mobility of the terminals. A terminal equipped with the Mobile IP function can remain connected, be reachable and maintain its connections while moving from one IP network to another, owing to the implementation in its original network (to which the terminal is connected) of a "Home Agent" function, which manages the connections between the terminal and the network visited. The mobility of a network uses this principle, applied to a router, in order to enable all of the terminals connected to said router in a situation of mobility to benefit from the same characteristics in terms of connection and reachability, when the network moves and changes points of connection with the host network (public IP network), regardless of the point of access to the host network. Specification work on the mobility of networks is currently being performed by the Nemo group at the IETF.

It appears that the current specifications concern exclusively either stationary networks or networks in a situation of mobility. Indeed, there is no solution today enabling a network in a situation of mobility, wanting to connect to an host IP network, to benefit, depending on the circumstances, either from the mobility mechanisms of the networks, or from the prefix delegation mechanisms, such as SOHO (Small Office/Home Office) networks connecting to their access provider.

Nevertheless, there are numerous situations in which it would be particularly advantageous for one IP network connecting to another IP network to be capable of benefiting, depending on the circumstances, from one or the other of these mechanisms.

Such a situation may, for example, arise in the case of a user having a vehicle equipped with an IP network. When the user returns his vehicle to the garage, he may want the IP network of his vehicle to be an integral part of the home IP network installed in his house, and thus to allow an address prefix delegation from the home router to the router of the network installed in his vehicle. The on-board terminals in the vehicle can thus be reached from the home network by way of an IP address consistent with the addressing plan of the latter, without implementing mobility mechanisms. However, if a visitor parks his vehicle equipped with an IP network near the user's home, the latter may not want the visitor to be capable of benefiting from an IP address prefix delegation of the home network, but may still establish a connection with an external correspondent by means of the home network, using the mobility mechanism in order to remain connected to an IP infrastructure. The router of the home network then assigns and IP address called "Care-Of-Address", and, in this case, the terminals of the visitor's vehicle are not configured with IP addresses of the addressing plan of the home network, and cannot therefore access services related to this addressing plan. However, with the "Home Agent" function in their original network, they can maintain their connections and be reachable via the home host network.

Another example relates, for example, to public transport means (taxi, bus, train, airplane) equipped with a local IP network. When the transport means host a client with a personal network, it is not desirable in principle for the client's personal network to be integrated with the local network of the transport means, benefiting from a range of addresses of the local network. It is indeed preferable to prevent the clients from being capable of accessing certain information of the transport means operator. In this case, the router of the transport means assigns only a "Care-Of-Address" address to the personal network of the client, which makes it possible to implement the mobility mechanisms involving the "Home Agent" of the client's router. However, if the personal network belongs to the operator of the transport means, it is desirable for it to be integrated with the local network by assigning an IP address prefix. In this case, the routing between the personal network and the public IP network is performed directly by the access provider used by the operator to access the public network.

Currently, only one or the other of these mechanisms, namely the assignment of a single address or the prefix delegation, can be used, since no means are provided for selecting one or the other of these mechanisms according to the circumstances.

The present invention is intended to overcome these disadvantages by proposing means making it possible for a host IP network to determine, upon connection of a visitor IP network, the appropriate access method to be implemented in order to provide access to the visitor network. This objective is achieved by providing a method for a visitor network to access a host network, including steps in which a router of the visitor network is connected to a router of the host network and transmits an address request thereto.

According to the invention, the address request message contains an identifier of the visitor router, and the method also includes steps in which the host router extracts the identifier of the visitor router's identifier from the address request received, and transmits, in response to the visitor router, an address assignment message containing either an address, or an address prefix of the host network, depending on the identifier of the visitor router extracted from the address request message.

According to a preferred embodiment of the invention, the host router determines, during the connection of the visitor router to the host router, whether it is authorised to assign an address to a visitor network, and the visitor router transmits an address request message only if the host router is authorised to assign an address.

According to a preferred embodiment of the invention, the identifiers of visitor routers capable of receiving an address prefix from the host network are stored in a list, and the host router determines whether the visitor router can receive an address assignment message containing an address prefix by searching the list for the identifier of the visitor router.

The address assignment message preferably contains an identifier of the host router.

The invention also relates to a host router intended to be connected to a host network in order to establish a connection with a visitor network by means of a visitor router, including processing means programmed to receive an address request message transmitted by a visitor router that attempts to connect to the host network.

According to the invention, the processing means of the host router are designed to extract from each address request message received an identifier of the visitor router that has transmitted the address request message, and to transmit an address assignment message containing either an address, or an address prefix of the host network, according to the identifier of the router extracted from the address request message received.

According to a preferred embodiment of the invention, the processing means of the host router are designed to access a list of identifiers of visitor routers capable of receiving an address prefix of the host network in order to determine whether a visitor router can receive an address assignment message containing an address prefix of the host network.

According to a preferred embodiment of the invention, the processing means of the host router are designed to determine whether access to the host network is authorised, and to refuse any connection attempt by a visitor router unless access to the host network is authorized.

According to a preferred embodiment of the invention, the processing means of the host router are designed to insert an identifier into the address assignment message.

The invention also relates to a visitor router intended to be connected to a visitor network in order to establish a connection with a host network by means of a host router, wherein the visitor router includes processing means designed to transmit an address request message intended for the host router.

According to the invention, the visitor router includes means for storing an identifier, wherein the processing means of the visitor router are designed to insert this identifier into the address request message, in order to receive, in response to the address request message, an address assignment message containing either an address or an address prefix of the host network, and in order to establish a connection with the host network using the address or the address prefix received.

The invention also relates to a system whereby a visitor network can access a host network, including a visitor router connected to the visitor network, and a host router connected to the host network, wherein the visitor and host routers include means for connecting to another router, the visitor router includes processing means designed to transmit an address request message to another router, and the host router comprises processing means designed to receive an address request message coming from another router, and the host and visitor routers are moreover as defined above.

The invention also relates to a computer program whereby a visitor network can access a host network including program code instructions for executing the steps of one of the methods defined above and intended to be executed by a visitor router, when said program is run on the visitor router.

The invention also relates to a computer program whereby a visitor network can access a host network including program code instructions for executing steps of one of the methods defined above and intended to be executed by a host router, when said program is run on the host router.

The invention also relates to a router-readable recording medium on which a program as defined above is recorded.

The invention also relates to an address request message transmitted by a visitor network to a host network and including an identifier of a router of said visitor network.

A preferred embodiment of the invention will be described below, by way of a non-limiting example, with reference to the appended drawings in which:

FIG. 1 diagrammatically shows a visitor network connected to a host network

FIG. 2 diagrammatically shows the architecture of a router;

FIG. 3 shows, in the form of a flow chart, a sequence of steps for assigning an IP address, executed during the connection of a visitor network to a host network.

FIG. 1 shows a host network 1 equipped with a host router 10 to which a visitor router 2 is connected by means of a visitor router 12.

According to the invention, router identifiers are assigned, "Requestor-router-ID" and "Delegator-router-ID", respectively for the visitor router 12 and the host router 10, enabling the routers to be mutually identified.

The host router 10 is also connected to a database 11 that stores identifiers of authorised visitor routers to be integrated into the host network 1 by assigning IP addresses of the latter. This database is kept up-to-date by an administrative terminal 13 of the host network 1, which can thus authorize or refuse new visitor routers. This database can be centralized (bus, taxi network, etc.).

The assignment of identifiers to the routers can be performed by a manual or an automatic configuration, by smart card or by bar code.

In FIG. 2, the routers 10, 12 conventionally include a processor 15, memories 16 and network interfaces 17, 18.

FIG. 3 shows a procedure for connection of a visitor router 12 to a host network by means of a host router, wherein the processor 15 and the memories 16 of the visitor and host routers are programmed to implement this procedure. In a first step 21 of this procedure, the visitor router 12 attempts to connect to the host router 10. In the next step 22, the host router determines whether the accesses to the host network are authorised and informs the visitor router of this, for example by transmitting to the visitor router a message of consent or refusal. This provision makes it possible to activate or deactivate the automatic delegation of addresses so as to be capable, as the case may be, of manually configuring the equipment and in particular the routers and preventing the various prompts that the host router may have to process.

In the next step 23, if the message received from the host router 10 is a refusal of access to the host network, the procedure is terminated. Otherwise, the visitor router 12 sends, in step 24, an address request message containing the identifier "Requestor-router-ID" of the router 12. This message is, for example, in the form "DHCP_Solicit" stipulated by the DHCP protocol.

In the next step 25, the host router 10 receives this message and reads the contents thereof. If, in the next step 26, the identifier of the visitor router appears in the database 11 as being authorised to integrate the host network 1, the host router 10 sends, in step 27, to the visitor router 12, an IP address prefix belonging to the host network, in an address assignment message, for example "DHCP_Offer" stipulated by the DHCP protocol. Otherwise, the address assignment message that is sent by the host router to the visitor router in step 28 contains an IP address to be used as "Care-Of-Address" by the mobility mechanism of the visitor router 12. The address prefix or the address inserted into the address assignment message is, for example, conventionally selected from a pool of addresses or prefixes.

The message "DHCP_Offer" also contains a field "Delegator-router-ID" in which the host router inserts its identifier so that the routers can be identified in subsequent exchanges.

In the context of the DHCP protocol, other messages such as "DHCP-Advertise", "DHCP-Request" and "DHCP-Reply" can be used.

Given that the DHCP protocol makes it possible to perform an IP address prefix delegation, the example described above is based on this protocol. However, the use of other protocols, such as ICMP (Internet Control Message Protocol), and even an extension of "Router Advertisement" messages used to provide a network prefix, can be envisaged in the context of the invention.

In the example described above, it is also considered that the host router performs the IP address prefix delegation and therefore performs the function of DHCP server. However, it is possible to envisage that this function is performed by separate servers.

In an alternative of the invention, the database 11 contains a list of identifiers of routers not authorised to access the host network 1. Step 26 thus includes a third alternative in which the identifier of the visitor router sent in the DHCP_Solicit message belongs to this list. If this is the case, the host router does not send the visitor router an address or an address prefix and the procedure is terminated.

The invention claimed is:

1. A method for a visitor network associated with an original network to access, by a visitor router, a host network by a host router, the host network being different than the original network,
the method comprising:
    storing, in a database connected to the host router, a list of identifiers of visitor routers authorized to access the host network,
    and upon an attempt by the visitor router to connect to the host router:
        transmitting, from the visitor router to the host router, an address request message containing an identifier of the visitor router;
        extracting, by the host router, the identifier of the visitor router from the address request message received;
        verifying, by the host router in the database, whether the extracted identifier of the visitor router appears in the database, and
        in response, depending on the result of the verification, selecting and performing actions A or B of a set of actions comprising A and B, wherein:
        A) if the extracted identifier appears in the database as being authorized to integrate the host network,
            transmitting, from the host router to the visitor router, an address assignment message containing an IP address prefix delegated by the host router, and
            using, by the visitor router, the IP address prefix for configuring IP addresses of the terminals of the visitor network so that they may integrate the host network: and
        B) if the extracted identifier appears in the database as not being authorized to integrate the host network,
            transmitting, from the host router to the visitor router, an address assignment message containing an IP address assigned by the host router, and
            using, by a mobility mechanism of the visitor router, the IP address as a "Care-Of Address" for terminals of the visitor network which are thus not configured with IP addresses of the addressing plan of the host network and cannot therefore access services related to this addressing plan.

2. The method according to claim 1, further comprising, prior to the transmission of the address request message from the visitor router to the host router, steps of:
    determining, by the host router, whether access to the host network is authorized, and depending on the results of the determination,
    transmitting, from the host router to the visitor router, a message of consent or refusal, if the message is a refusal of access to the host network, terminating the procedure, and
    if the message is a consent of access, then proceeding with the remaining steps.

3. The method according to claim 1, wherein the address assignment message contains an identifier of the host router.

4. The method according to claim 1, wherein the address assignment message is not generated in accordance with a NAT or an IPSec protocol.

5. The method according to claim 1, wherein the visitor router is assigned a requestor router identifier, and the host router is assigned a delegator router identifier.

6. The method according to claim 5, wherein the requestor router identifier is sent in the address request message, and the delegator router identifier is sent in the address assignment message.

7. The method according to claim 1, wherein the database comprising a list of identifiers of visitor routers authorized to access the host network is kept up-to-date by an administrative terminal of the host network, which can thus authorize or refuse new visitor routers.

8. A host router for connection of a visitor network by a visitor router to a host network different from an original network associated with the visitor network, the host router being connected to a previously-stored database storing a list of identifiers of visitor routers authorized to access the host network,
    the host router comprising:
    a processor programmed to, in response to an attempt by a visitor router to connect to the host network:
    receive, from the visitor router, an address request message,
    extract the identifier of the visitor router from the address request message received,
    verify, in the database, whether the extracted identifier of the visitor router appears in the database; and
    in response, depending on the result of the verification, select and perform actions A or B of a set of actions comprising A and B; wherein:
A) if the extracted identifier appears in the database as being authorized to integrate the host network, transmit, to the visitor router, an address assignment message containing an IP address prefix delegated by the host router, such that the IP address prefix may be used by the visitor router for configuring IP addresses of the terminals of the visitor network so that they may integrate the host network,
B) if the extracted identifier appears in the database as not being authorized to integrate the host network, transmit, to the visitor router, an address assignment message containing an IP address assigned by the host router, such that the IP address may be used by a mobility mechanism of the visitor router as a "Care-Of Address" for the terminals of the visitor network which are thus not configured with IP addresses of the addressing plan of the host network and cannot therefore access services related to this addressing plant.

9. The host router according to claim 8, wherein the processor of the host router is configured to determine whether access to the host network is authorized, and to refuse any connection attempt by a visitor router unless access to the host network is authorized.

10. The host router according to claim 8, wherein the processor of the host router is configured to insert an identifier into the address assignment message.

11. A visitor router for connection of a visitor network, associated with an original network, to a host network by a host router, the host router being connected to a previously-stored database storing a list of identifiers of visitor routers authorized to access the host network,
the visitor router being connected to a memory storing a visitor identifier and comprising:
a processor programmed to, upon an attempt to connect to the host network:
insert the stored identifier into an address request message, transmit the address request to the host router, and
after extraction by the host router of the identifier of the visitor router from the address request message received and verification by the host router of the extracted identifier of the visitor router in the database,
in response and depending on the result of the verification, performing actions A or B, of a set of actions comprising A and B, as follows:
A) receive from the host router, if the extracted identifier appears in the database as being authorized to integrate the host network, an address assignment message containing an IP address prefix delegated by the host router, such that the visitor router may use the IP address prefix for configuring IP addresses of the terminals of the visitor network so that they may integrate the host network, and
B) receive from the host router, if the extracted identifier appears in the database as not being authorized to integrate the host network, an address assignment message containing an IP address assigned by the host router, such that a mobility mechanism of the visitor router may use the IP address as a "Care-Of Address" for terminals of the visitor network which are thus not configured with IP addresses of the addressing plan of the host network and cannot therefore access services related to this addressing plan and may not integrate the host network.

12. A system comprising a visitor router connected to a visitor network and associated with an original network and a host router connected to a host network and a previously-stored database comprising a list of identifiers of visitor routers authorized to access the host network,
wherein the host router comprises a host router processor configured to receive an address request message coming from another router, the host router processor being:
programmed to receive an address request message transmitted by a visitor router that attempts to connect to the host network,
configured to extract, from each received address message request, an identifier of the visitor router that has transmitted the address request message,
configured to verify, in the database, whether the extracted identifier of the visitor router appears in the database, and
configured to perform actions A or B, of a set of actions comprising A and B, as follows:
A) select and transmit to the visitor router, if the extracted identifier appears in the database as being authorized to integrate the host network, an address assignment message containing an IP address prefix delegated by the host router, such that the visitor router may use the IP address prefix for configuring IP addresses of the terminals of the visitor network so that they may integrate the host network,
and
B) select and transmit to the visitor router, if the extracted identifier appears in the database as not being authorized to integrate the host network, an address assignment message containing an IP address assigned by the host router, such that a mobility mechanism of the visitor router may use the IP address as a "Care-Of Address" for terminals of the visitor network, which are thus not configured with IP addresses of the addressing plan of the host network and cannot therefore access services related to this addressing plan,
wherein the visitor router comprises a visitor router processor configured to transmit an address request message intended for the host router, wherein the visitor router processor includes a memory for storing an identifier, and wherein the visitor router processor further is configured to
insert the identifier into the address request message, and
in response to the address request message, after verification by the host router of the extracted identifier of the visitor router in the database comprising the list of identifiers of visitor routers authorized or not authorized to access the host network, performing actions A or B, of a set of actions comprising A and B, as follows:
A) receive from the host router, if the extracted identifier appears in the database as being authorized to integrate the host network, an address assignment message containing an IP address prefix delegated by the host router, such that the visitor router may use the IP address prefix for configuring IP addresses of the terminals of the visitor network so that they may integrate the host network,
B) receive from the host router, if the extracted identifier appears in the database as not being authorized to integrate the host network, an address assignment message containing an IP address assigned by the host router, such that a mobility mechanism of the visitor router may use the IP address as a "Care-Of Address" for the terminals of the visitor network which are thus not configured with IP addresses of the addressing plan of the host network and cannot therefore access services related to this addressing plan.

13. The system according to claim 12, wherein the visitor router is assigned a requestor router identifier, and the host router is assigned a delegator router identifier.

14. The system according to claim 13, wherein the requestor router identifier is sent in the address request message, and the delegator router identifier is sent in the address assignment message.

15. The system according to claim 12, wherein the database comprising a list of identifiers of visitor routers authorized to access the host network is kept up-to-date by an administrative terminal of the host network, which can thus authorize or refuse new visitor routers.

16. A non-transitory computer readable medium encoded with a computer program product for a visitor network associated with an original network to access, by a visitor router, a host network connected to a host router and different than the original network, the host router being also connected to a previously-stored database comprising a list of identifiers of visitor routers authorized to access the host network, the computer program product comprising program code instructions that, when executed by a visitor router on the visitor network, perform the following operations:
attempting to connect the router of the visitor network to a router of the host network;
transmitting, from the visitor router to the host router, an address request message containing an identifier of the visitor router;
after extraction by the host router of the identifier of the visitor router from the address request message received and verification by the host router of the extracted identifier of the visitor router in the database,
in response, and depending on the result of the verification, actions A or B of a set of actions comprising A and B, wherein:
A) if the extracted identifier appears in the database as being authorized to integrate the host network,
receiving, by the visitor router from the host router, an address assignment message containing an IP address prefix delegated by the host router, and
using, by the visitor router, the IP address prefix for configuring IP addresses of the terminals of the visitor network so that they may integrate the host network,
and
B) if the extracted identifier appears in the database as not being authorized to integrate the host network,
receiving, by the visitor router from the host router, an address assignment message containing an IP address assigned by the host router, and
using, by a mobility mechanism of the visitor router, the IP address as a "Care-Of Address" for terminals of the visitor network which are thus not configured with IP addresses of the addressing plan of the host network and cannot therefore access services related to this addressing plan.

17. The non-transitory computer readable medium encoded with a computer program product according to claim 16, wherein the computer readable media comprises router-readable recording medium on which the program code instructions are recorded.

18. A non-transitory computer readable medium encoded with a computer program product for a visitor network associated with an original network to access, by a visitor router, a host network connected to a host router and different than the original network, the host router being also connected to a previously-stored database comprising a list of identifiers of visitor routers authorized to access the host network, the computer program product comprising program code instructions that, when executed by a host router on the host network, perform the following operations:
upon an attempt by the visitor router to connect to the host network:
receiving, from the visitor router, an address request message containing an identifier of the visitor router;
extracting the identifier of the visitor router from the address request message received,
verifying, in the database whether the extracted identifier of visitor router appears in the database, and
in response, depending on the result of the verification, selecting and performing actions A or B of a set of actions comprising A and B, wherein:
A) if the extracted identifier appears in the database as being authorized to integrate the host network, transmitting, to the visitor router, an address assignment message containing an IP address prefix delegated by the host router, such that the visitor router may use the IP address prefix for configuring IP addresses of the terminals of the visitor network so that they may integrate the host network,
and
B) if the extracted identifier appears in the database as not being authorized to integrate the host network, transmitting, to the visitor router, an address assignment message containing an IP address assigned by the host router, such that a mobility mechanism of the visitor router may use the IP address as a "Care-Of Address" for terminals of the visitor network which are thus not configured with IP addresses of the addressing plan of the host network and cannot therefore access services related to this addressing plan.

19. The non-transitory computer readable medium encoded with a computer program product according to claim 18, wherein the computer readable media comprises router-readable recording medium on which the program code instructions are recorded.

* * * * *